Sept. 25, 1962 M. E. McCORD ET AL 3,055,023
BOAT BOW
Filed Sept. 15, 1960 2 Sheets-Sheet 1
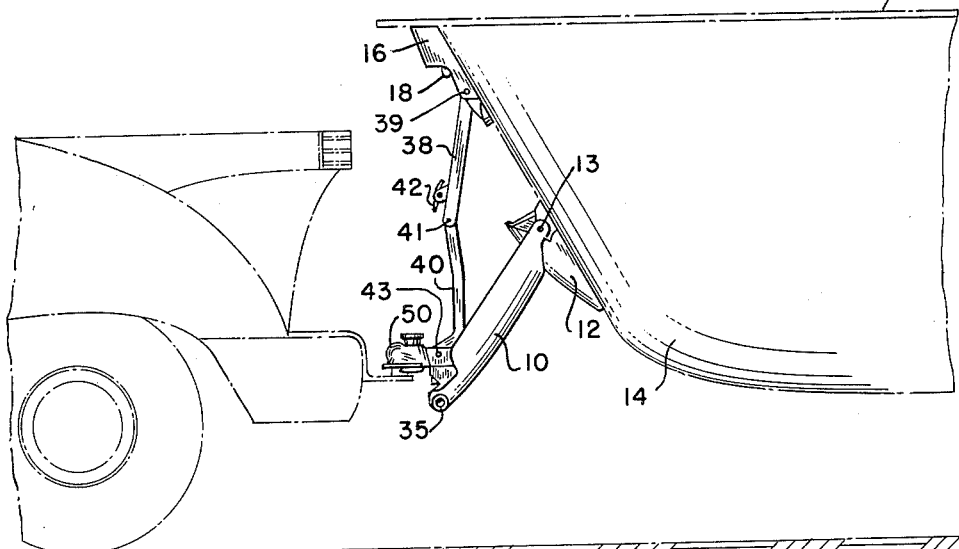
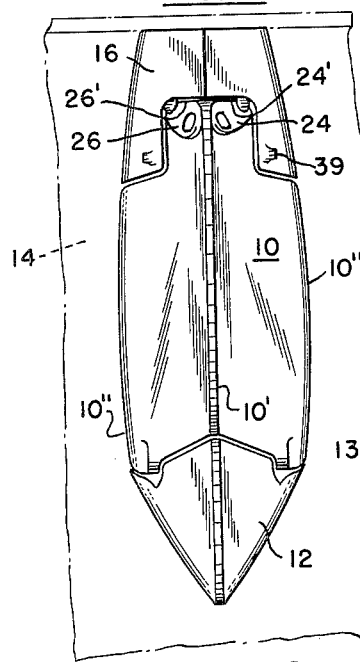
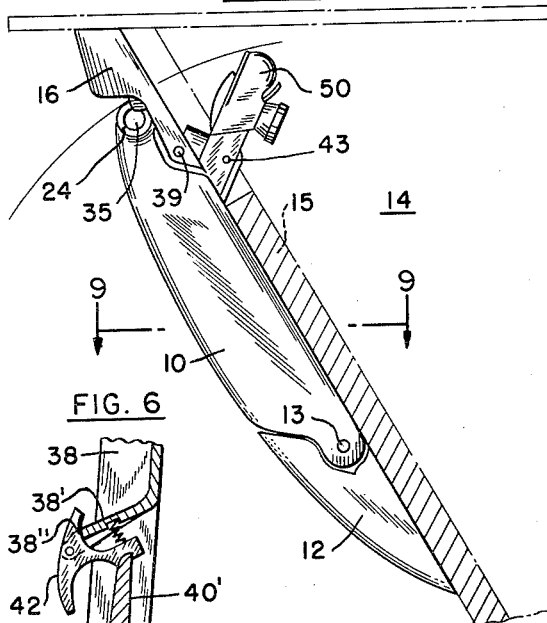
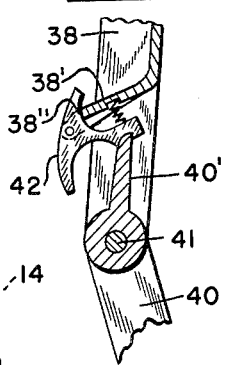
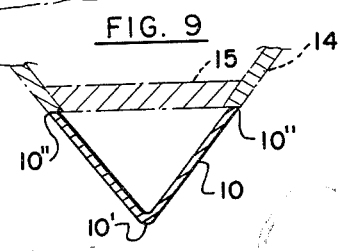
INVENTORS
EDGAR R. McCORD
MILES E. McCORD
BY *Wesley Everett*
ATTORNEY Sept. 25, 1962 M. E. McCORD ET AL 3,055,023
BOAT BOW
Filed Sept. 15, 1960 2 Sheets-Sheet 2

INVENTORS
EDGAR R. McCORD
MILES E. McCORD
BY J. Wesley Everett
ATTORNEY

United States Patent Office 3,055,023
Patented Sept. 25, 1962

3,055,023
BOAT BOW
Miles E. McCord, 4639 Marble Hall Road, Baltimore, Md., and Edgar R. McCord, 2926 Alberta, Baltimore County, Md.
Filed Sept. 15, 1960, Ser. No. 56,188
3 Claims. (Cl. 9—1)

The present invention relates to a combination boat bow unit and vehicle hitch to be used in particular with a boat where the supporting wheels of the boat are attached to the boat hull and the bow of the boat is hitched to the rear of the vehicle. The present application is a continuation-in-part of our prior application filed February 3, 1958, Serial No. 712,906, now Patent Number 2,954,569.

The primary object of the invention is to provide the forwardmost part of the boat bow with means for hitching the boat to a vehicle.

Another object of the invention is to provide a hitch that will form a part of the boat bow when in its folded position, that is, the front edge of the device will be narrow and flanged outwardly at its rear edge to conform with the general curvature of the boat bow.

While several objects of the invention have been set forth other objects, uses and advantages will become apparent as the nature of the invention is more fully disclosed, which consists in its novel construction, arrangement and combination of its several parts illustrated in the accompanying drawings and described in the detail description to follow. In the drawings:

FIGURE 1 is a view in side elevation of the opened hitch illustrating its use in attaching a boat to a vehicle.

FIGURE 2 is a view in side elevation of the closed hitch showing it a part of the boat bow.

FIGURE 3 is a view of the hitch in closed front elevation.

FIGURE 6 is a sectional view taken on line 6—6 of FIGURE 5.

In describing the combination boat bow and vehicle hitch like numerals are used to designate like and similar parts through the several views.

Figure 5:
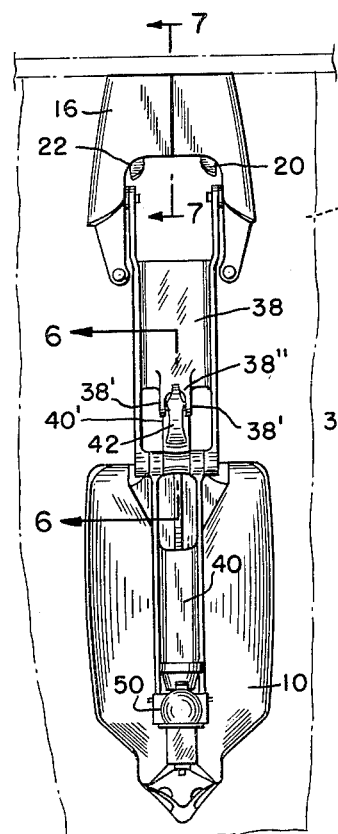
FIGURE 5 is front view in elevation of the open hitch as shown in FIGURE 4.

In FIGURE 1 the hitch is shown lowered in open position to be attached to a conventional ball fitting carried on the rear of a vehicle. The hitch has a hinged plate 10 which is hinged by the pin 13 to a member 12 fixed to the lower portion of the bow of the boat 14, the front edge of the bow of the boat being cut back to allow for the hitch as shown at 15 in FIGURE 9. When the plate is in folded position as shown in FIGURE 2 it becomes the forwardmost part of the boat bow. Positioned on the boat bow at the top of the hinged plate 10 is a second fixed member 16 which possesses a latching means 18 for holding the upper end of the plate member 10 upwardly and adjacent the bow of the boat when the boat is water borne.

In FIGURES 3 and 9 the cross-sectional form of the plate 10 is shown as narrow along its front edge 10' and flared outwardly at 10" to conform with the general contour of the boat bow, the hitch occupying the space on the boat bow from the portion 15 forward.

Figures 7, 8:
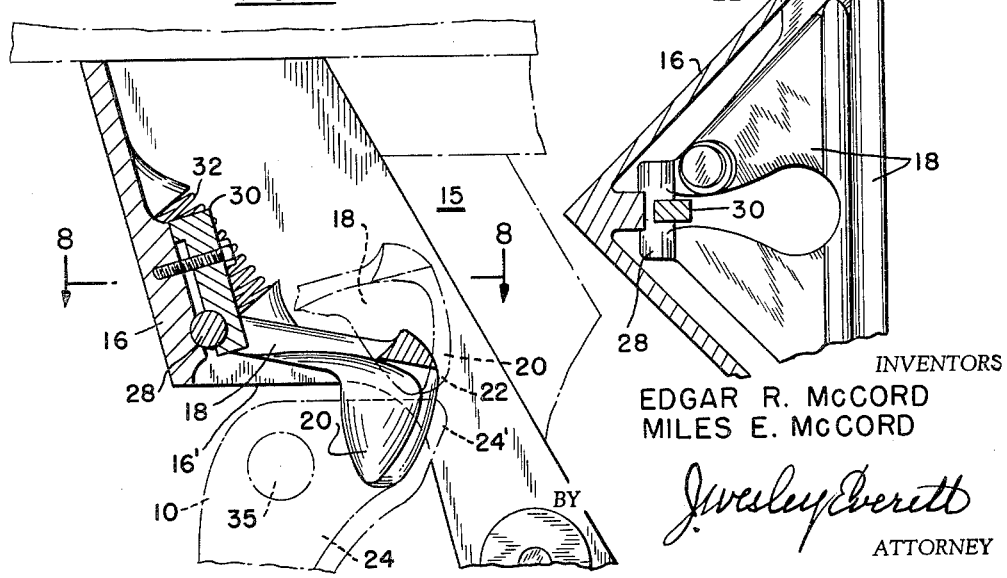
FIGURE 7 is a sectional view taken along line 7—7 of FIGURE 5.
FIGURE 8 is a sectional view taken along line 9—9 of FIGURE 2.

The latch 18 is shown in detail in FIGURES 7 and 8 and is in plan view of triangular form which has extending downwardly therefrom and at the rear thereof two projections 20 and 22. These projections extend downwardly below the edge 16' of the fixed member 16 and in the path of the upper end of the plate 10. The latch is hinged about a pin 28, which is held in position by a plate 30 and the latch is held downwardly by a compression spring 32. The downward travel of the latch being limited to a projection 34 carried on each side of the fixed member 16 (only one being shown in FIGURE 8). The plate 10 is recessed at each side of the center upper portion 10' as shown at 24 and 26, leaving a back portion 24' and 26', whereby when the plate 10 is raised as shown in FIGURE 3 the latch 18 is raised by forcing the upper end portions 24' and 26' of the plate against the projections 20 and 22, as shown in dotted lines in FIGURE 7, and when the portions 24' and 26' of the plate pass, the projections drop in front of the portions 24' and 26' as shown in full lines in FIGURE 7. When it is desired to lower the hitch the projections on the latch are pressed rearwardly until it clears the upper end of the plate 10, which is the position shown by the dotted lines in FIGURE 7 whereby, the upper end of the plate 10 may be pulled forward and downwardly by extending a finger through the hole 35 formed in the upper end of the plate 10.

Figure 4:
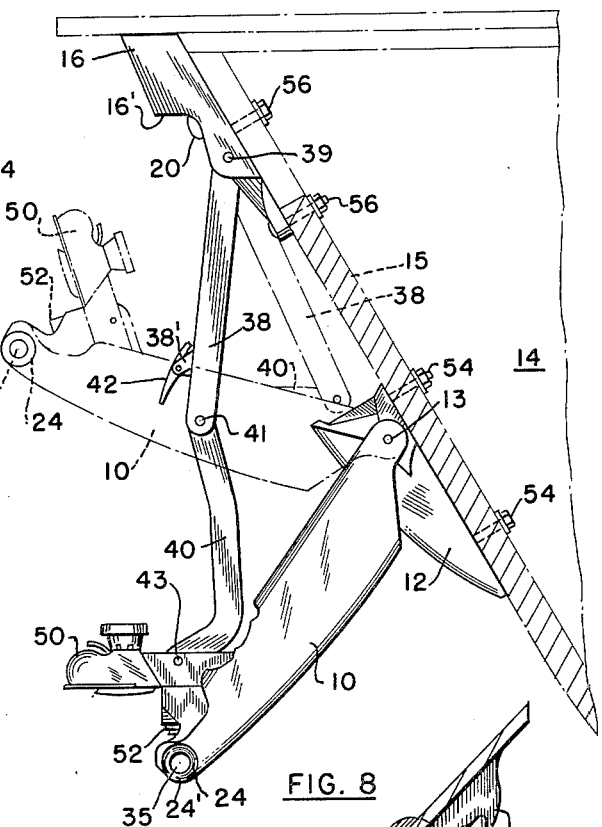
FIGURE 4 is an enlarged view in elevation of the open hitch in full lines and partly closed in dot dash lines.

For positioning the plate downwardly and outwardly in position to attach the hitch to the vehicle there is provided a pair of link members 38 and 40. One link member designated as 38 has one end hingedly connected with the fixed member 16 by a pin 39 which also carries the latch 18 just described, the other end being hingedly connected to one end of the member 40 by the pin 41. The lower end of the link member 40 being hingedly connected with the upper end of the plate 10 by the pin 43. The link members are foldable, as shown in dot dash lines in FIGURE 4, to allow the plate 10 to be moved about the pin 13 in the fixed member 12. The plate may be locked in place by the latch member, as shown in FIGURE 2.

For holding the link members in extended position there is provided a second spring loaded latch 42 carried by one of the link members as shown in FIGURE 6. This latch member is carried on the member 38. The latch 42 is hingedly supported on an outwardly turned forked position 38'. The latch is adapted to engage an extension 40' carried on the end of the link member 40 which extends beyond the pin 41 connecting the two link members and through a cutaway portion in the member 38. The latch 42 is retained in its normal resting position by coming in contact with the edge 38" of the forked member 38'. In FIGURE 6 the position of the latch is shown when in engagement with the portion 40' which prevents the link member from collapsing.

Fixedly secured to the upper end of the plate 10 is a member 50, preferably a female socket joint adapted to engage a male member (not shown) carried on the rear of a vehicle as shown in FIGURE 1. This member may be fixed to the plate by a suitable bolt 52, or other conventional means.

The fixed member 12 is secured to the bow portion 15 by the bolts 54 and the fixed member 16 is secured to the bow portion 15 by the bolts 56 or by other conventional means.

With the present arrangement a boat carrying its own supporting wheels may be towed by a practical apparatus, which when not being used as a hitch is foldable to lie adjacent and form the forward portion of the boat bow and in fact become a part of the boat. By the use of self supporting wheels and the present hitch everything necessary to haul the boat over land is contained on the boat, which means a separate trailer and separate hitching means may be dispensed with.

Thus it is seen that an apparatus made in accordance with the invention is well adapted to accomplish the objects of the latter. It is understood however that various changes in the details of construction and in the forms and arrangement of parts may be made without departing from the underlying idea or principles of the present invention within the scope of the appended claims.

We claim:

1. A combination bow unit and vehicle hitching means adapted to be attached to the forward end of a boat bow comprising, an elongated plate hinged at its bottom end to a fixed support carried by the bow of the boat adjacent the bottom thereof, a fixed upper support for the hinged plate fixedly secured to the boat bow and positioned above the lower fixed support and at a distance therefrom to engage the upper end of the plate when the plate is positioned upwardly adjacent the bow of the boat for supporting the upper end of the plate adjacent the boat bow and latch means cooperating between the upper end of the hinged plate and the upper support for releasably holding the plate in its upward position and plate positioning means cooperating between the plate and the upper fixed support for positioning the upper end of the plate outwardly and downwardly from the boat bow and means carried on the side of the plate adjacent the boat bow and at the upper end of the plate for attaching the same to the vehicle.

2. In a combination bow unit and vehicle hitching means as claimed in claim 1 in which, the plate positioning means cooperating between the plate and the upper fixed support comprises, a pair of link members having one of their ends hingedly linked together and the other end of one of the link members hingedly connected to the upper end of the plate and the other end of the other link member hingedly connected to the upper fixed support and means for releasably locking the link members in extended position.

3. In a combination bow unit and vehicle hitching means as claimed in claim 1 in which at least the plate has a narrow forward edge and a flared portion forming a two sided rear edge, the flare of the rear portion of the plate being such as to have each of its rear side edges coincide with the outer surface of the boat hull along the lines connecting the bow unit to the boat bow.

References Cited in the file of this patent

UNITED STATES PATENTS

| | | |
|---|---|---|
| 2,038,975 | Willetts | Apr. 28, 1936 |
| 2,941,755 | Westcott | June 21, 1960 |